United States Patent

Schierling et al.

[11] Patent Number: 5,669,478
[45] Date of Patent: Sep. 23, 1997

[54] AIR-COOLED FLYWHEEL AND A FRICTION CLUTCH FOR A TRANSMISSION OF A MOTOR VEHICLE, THE FLYWHEEL HAVING TWO CENTRIFUGAL MASSES

[75] Inventors: Bernhard Schierling, Kürnach; Rudolf Baüerlein, Schweinfurt; Cora Carlson, Hambach; Hilmar Göbel, Grafenrheinfeld, all of Germany

[73] Assignee: Fichtel & Sachs AG, Schweinfurt, Germany

[21] Appl. No.: 504,848

[22] Filed: Jul. 20, 1995

[30] Foreign Application Priority Data

Jul. 20, 1994 [DE] Germany .................. 44 25 570.5

[51] Int. Cl.$^6$ .................. F16F 15/12; F16F 15/16; F16D 13/60
[52] U.S. Cl. .................. 192/70.17; 192/208; 192/113.2; 74/574; 464/68
[58] Field of Search .................. 192/70.17, 70.12, 192/208, 113.2, 113.23; 74/574; 464/17, 68

[56] References Cited

U.S. PATENT DOCUMENTS

| 5,042,632 | 8/1991 | Jackel | 192/208 X |
| 5,135,092 | 8/1992 | Jackel | 192/208 X |
| 5,146,811 | 9/1992 | Jackel | 192/208 X |
| 5,150,777 | 9/1992 | Friedmann | 192/70.17 |
| 5,156,249 | 10/1992 | Friedmann | 192/70.17 X |
| 5,261,516 | 11/1993 | Friedmann | 192/208 X |
| 5,279,182 | 1/1994 | Fukushima | |
| 5,293,977 | 3/1994 | Friedmann | 192/70.17 |
| 5,293,978 | 3/1994 | Reik et al. | 192/70.17 |
| 5,476,166 | 12/1995 | Schierling et al. | 192/70.17 X |

FOREIGN PATENT DOCUMENTS

| 3447180 | 7/1986 | Germany . |
| 3611254 | 10/1986 | Germany . |

*Primary Examiner*—Rodney H. Bonck
*Assistant Examiner*—Saul Rodriguez
*Attorney, Agent, or Firm*—Nils H. Ljungman and Associates

[57] ABSTRACT

A flywheel with two centrifugal masses has a secondary centrifugal mass assembled from two individual parts, wherein the first part is actively connected to a torsion damping device, and the second part has a friction surface for a friction clutch. To increase the useful life of the flywheel system, the two parts of the secondary centrifugal mass are held at a distance from one another, and are connected to one another in their radially inner area essentially only by means of axially projecting spacer elements, which spacer elements are distributed circumferentially, and by means of rivets or screws. The rear side of the second part of the secondary centrifugal mass can thus be air cooled by the system of air cooling passages.

17 Claims, 14 Drawing Sheets

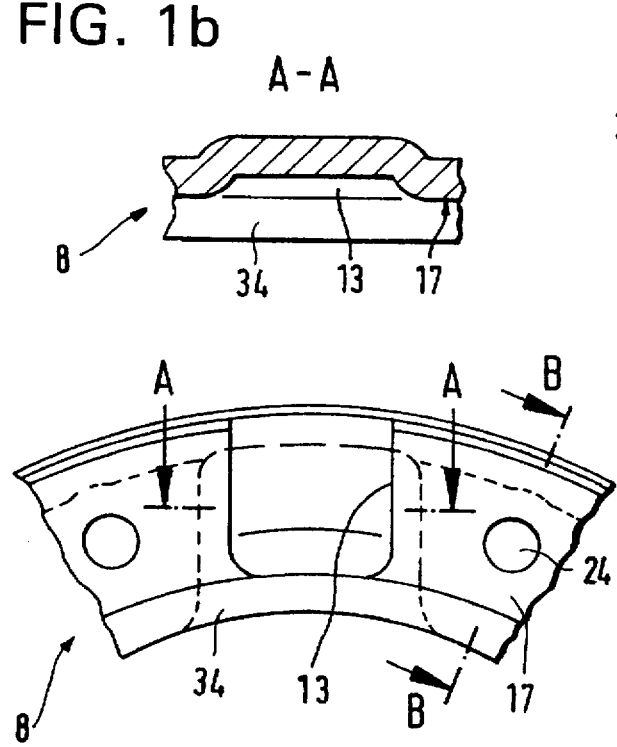
FIG. 1b
FIG. 1c
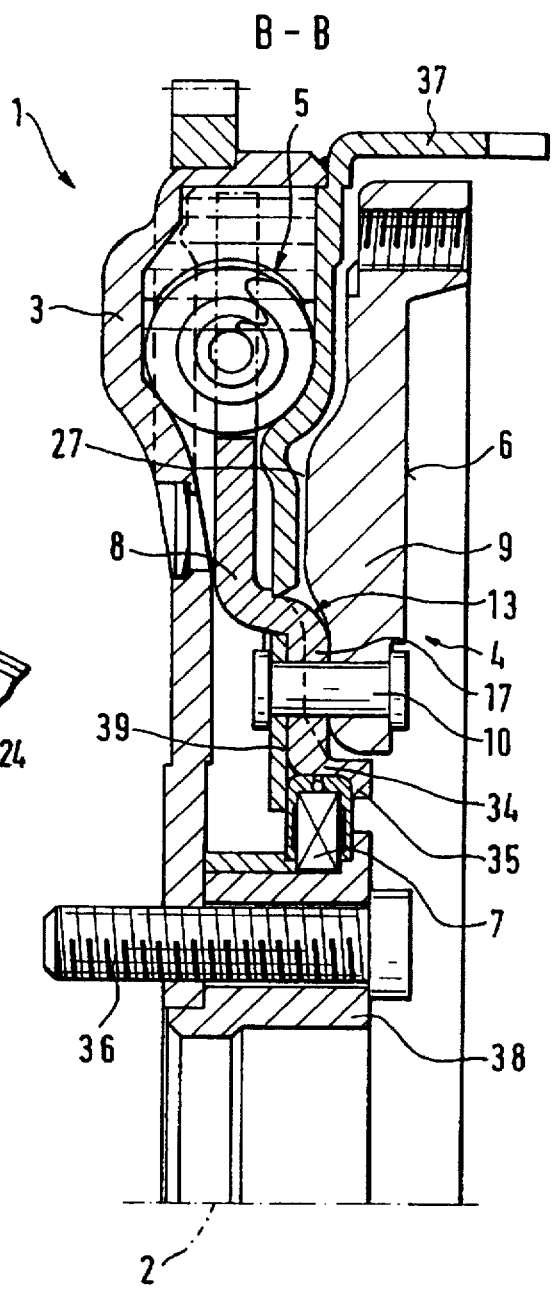
FIG. 1

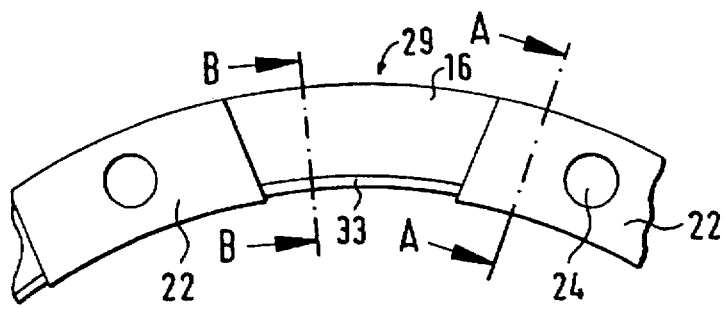
FIG. 7a
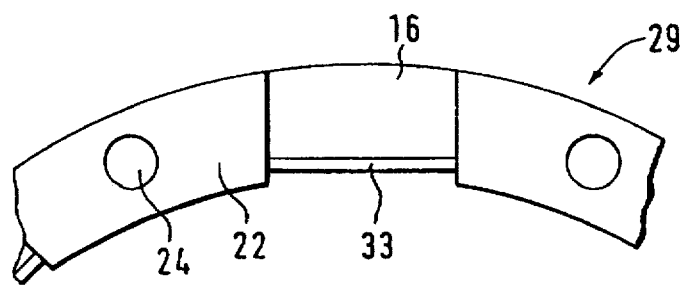
FIG. 7b
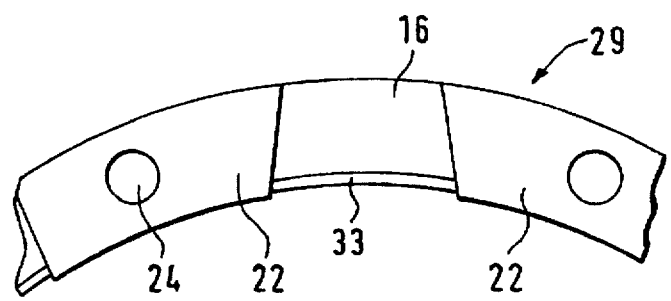
FIG. 7c
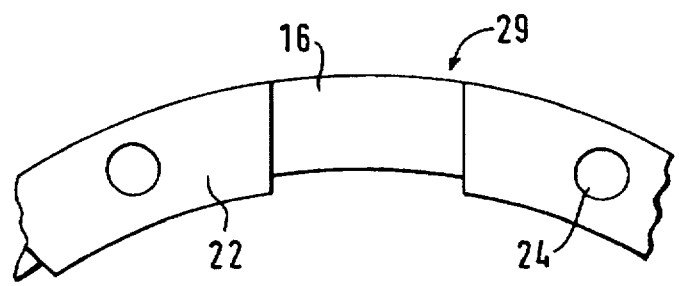
FIG. 7d
FIG. 7e
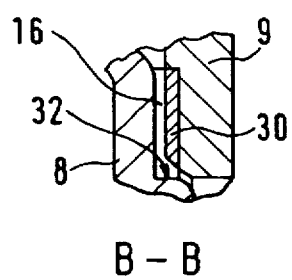
B - B
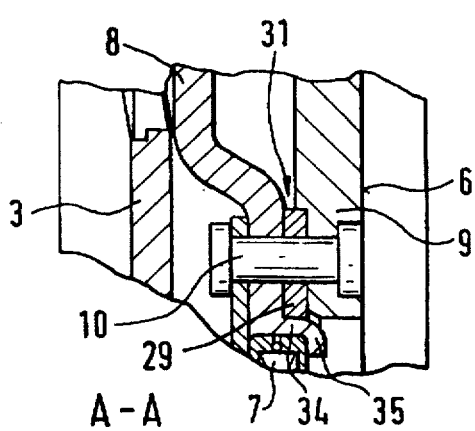
FIG. 7f
A - A

B-B

A-A

AIR-COOLED FLYWHEEL AND A FRICTION CLUTCH FOR A TRANSMISSION OF A MOTOR VEHICLE, THE FLYWHEEL HAVING TWO CENTRIFUGAL MASSES

BACKGROUND OF THE INVENTION

1. Field of the Invention

The present invention generally relates to a flywheel for an internal combustion engine, the flywheel including a first centrifugal mass connected to a crankshaft, which first centrifugal mass defines an axis of rotation, and a second centrifugal mass. The second centrifugal mass is rotationally mounted on the first centrifugal mass, and is also rotationally connected to the first centrifugal mass by means of a damping device. The flywheel can also include a friction clutch connected to the second centrifugal mass for the transmission of the torque, which clutch can have a friction surface on the driven side of the second centrifugal mass. In addition, a bearing located between the two centrifugal masses for the mutual fastening of the two centrifugal masses can be provided. The second centrifugal mass can have two parts, a first part and a second part, the first part acting as an output part of the torsion damper device and being connected to the bearing, and the second part having the friction surface. The two parts are screwed or riveted together by means of surfaces which can extend essentially radially.

2. Background Information

A flywheel with two centrifugal masses is disclosed, for example, in Unexamined. German Patent Application 34 47 180. On this flywheel with two centrifugal masses, between the fastening element supported by the bearing, which fastening element is non-rotationally connected to the output part of the damping device, and the component supporting the friction clutch, there is an insulating layer which prevents the transmission of heat from the friction clutch to the bearing.

Unexamined German Patent Application 36 11 254 discloses an additional flywheel with two centrifugal masses, in which the secondary centrifugal mass simultaneously forms the bearing seat, and the temperature flux is reduced by openings which are cast in between the friction surface and the bearing. This publication specifies that a cast metal part is required.

OBJECT OF THE INVENTION

The object of the present invention, on a flywheel with two centrifugal masses, essentially without specifying the type of manufacture of the secondary centrifugal mass, is to employ simple means to prevent the transmission of heat from the friction surface to the bearing, while simultaneously discharging the heat.

SUMMARY OF THE INVENTION

The present invention teaches that this object can be accomplished if both of the two parts of the second centrifugal mass, in their area of connection, are, by way of spacer elements, in contact with each other essentially only in the vicinity of the connecting elements. In addition, air cooling passages, which air cooling passages extend essentially radially, are located circumferentially between the connecting elements. Due to the two-part construction of the second centrifugal mass and the location of the spacer elements, the most favorable type of manufacture can be selected for the two parts, whereby at the same time, even in these locally limited areas, the transmission of heat can be reduced by the spacer elements. At the same time, the rear side of the component which has the friction surface can be cooled by moving air.

The present invention further teaches that the spacer elements can be an essentially integral part of at least one of the two parts of the second centrifugal mass. In this manner, the number of individual parts can preferably be reduced.

In accordance with one embodiment, the spacer elements can be formed by or from the first part if the first part, which can be made from a piece of sheet metal, is corrugated both circumferentially and concentrically with respect to the axis of rotation in the vicinity of the connecting elements. Further, the first part can preferably have areas projecting in an alternating manner out of the plane of the first part towards the second part, with flat contact surfaces opposite the second part. These contact surfaces or areas can be penetrated by openings, in which openings the connecting elements can be located. Such a one-piece configuration of the spacer elements is particularly economical, because it requires essentially only the plastic deformation of a sheet metal part.

In accordance with another embodiment, it can also be possible to design the spacer elements of the first part, which first part can be made of sheet metal, in the form of holes. These holes can essentially be produced without cutting, and can be formed preferably by plastic deformation.

The invention also teaches that the spacer elements can alternatively be formed by the second part, in that on the second part, on a common diameter concentric to the axis of rotation, there can be axially raised portions extending towards the first part. These raised portions can have flat contact surfaces, which contact surfaces can be penetrated by openings for the connecting elements which extend into the first part. If the second part is a cast part, these axially raised portions can be cast in one piece with one another. However, it is also conceivable that the second part can be manufactured by some process other than casting, in which case the spacer elements, as on the first part, can be manufactured by partial plastic deformation. Economical manufacturing processes can be employed in both cases.

An additional possibility for the formation of air cooling passages, which air cooling passages can essentially extend radially, is that several areas can be located circumferentially between the air cooling passages which also extend essentially radially. These areas can be penetrated by openings for connecting elements which extend into the other part. Such a type of air cooling can easily be realized both in the first part and in the second part.

To improve the guidance of the second part on the first part, the areas of connection can be provided with an encircling groove, the outside diameter of which groove is larger, and the inside diameter of which groove is smaller, than the outside and inside envelopes, respectively, of the connecting elements. In addition, a centering projection of the first part can project into this groove. Such a guide groove can facilitate the balancing of the overall flywheel with two centrifugal masses, preferably after the flywheel has been assembled.

In other words, and in accordance with one embodiment of the present invention, the outside and inside diameters of the groove can both be larger than the diameter of the connecting elements.

The present invention further teaches that the spacer elements can alternatively be part of the connecting elements themselves. In accordance with this embodiment of the present invention, the connecting elements, between their terminal areas, can each have a stop area of a corresponding axial extension for the two parts. In addition, the connecting elements can have an expanded diameter which forms a stop edge on each of the two stop areas for each of the two parts, and a corresponding gap between the two parts can thus be achieved. With such an embodiment, essentially no consideration need be given to the formation of spacer elements either on the first or on the second part. In particular, when rivets are used as the connecting elements, the rivets can be provided with a stop area which has a larger diameter than the rest of the respective rivets, and the rivets can thus simultaneously form the spacer elements. The stop areas can thereby be partly submerged in corresponding centering recesses of the first part and the second part, thereby achieving a reliable fastening between the two parts. The radial centering is therefore not indicated for the areas of the rivet shanks.

In addition to the gap formed between the first part and the second part by the spacer elements, essentially radial air cooling passages can be located circumferentially between the connecting elements, in the second part. Thus, in addition to the gap formed between the first part and the second part, which under some conditions should preferably be kept small due to axial space problems, an additional current of cooling air can be conducted on the reverse side of the second part.

An additional advantageous possibility for the design of a flywheel with two centrifugal masses can be achieved if the spacer elements are combined into a separate spacer ring oriented concentrically to the axis of rotation, and if the spacer ring is penetrated by the connecting elements, which connecting elements can preferably be in the form of rivets. The manufacture of a separate spacer ring can be advantageous to the extent that, regardless of the realization of air cooling passages which extend essentially radially, the transmission of heat in the vicinity of the contact points can be reduced by the two mold seams connected with this spacer ring. The spacer ring can thereby include an encircling, essentially Uninterrupted carrier ring, from which carrier ring individual spacer elements can project in the axial direction, namely in the vicinity of the connecting elements. For the radial coordination of the first part and the second part, the spacer ring, in the vicinity of the outside diameter of the carrier ring, can preferably be fixed on a centering point of the second part, and can also be engaged on a centering point of the first part. Thus, the mutual correspondence of the two parts by means of the spacer ring is advantageous, and can be realized with very low tolerances.

Radially inside the connecting elements, the first part can be advantageously angled or bent axially toward the second part, and can have a shoulder for locating the bearing. Thus, even when the first component is made of a relatively thin-walled material, there can be a secure bearing point for the bearing. The fixing of the bearing in the direction of the second part can thereby be realized by a radially inward extending edge of the shoulder, and, in the opposite direction by one or more retaining elements which are held in place by the connecting elements. The connecting elements for the first and second parts or components can thereby also perform the function of the axial fixing of the bearing in the device.

The spacer rang can be fixed on the first part or component, because the first component, radially inside the spacer ring, is preferably angled axially towards the second part, and with a centering shoulder forms a shoulder to center the spacer ring on the side opposite the carrier ring.

In other words, the first part can be angled or bent axially towards the second part, and, for the purpose of centering the spacer ring, preferably forms, on the side opposite the carrier ring, a shoulder with a centering shoulder. The spacer ring, in addition to the function of providing thermal insulation and forming cooling air passages, can thus also serve to center the two parts in relation to one another.

The backing ring, to improve the flow of cooling air, can thereby preferably be shortened from radially inside, circumferentially between the spacer elements, and can also be provided with a bevel.

The use of heat-resistant, non-ferrous materials for the spacer ring can be particularly advantageous. The transmission of heat can thereby also be prevented, even on the relatively small contact surfaces of the facing parts.

However, it is also possible to manufacture the spacer ring from injection molded aluminum. The spacer ring can then be used directly, essentially without any additional surface treatment.

In accordance with one additional embodiment, the spacer ring can be assembled from individual sheet metal elements, whereby the carrier ring can be realized as one piece, and the spacer elements can be manufactured individually and installed on the carrier ring. Such a method of manufacture can permit greater flexibility with regard to different flywheels with two centrifugal masses with a similar connection of the first part to the second part.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a manual transmission for a motor vehicle, the manual transmission comprising: a friction clutch, the friction clutch comprising: a flywheel, the flywheel having an axis of rotation and defining an axial direction parallel to the axis of rotation; a clutch disc; a pressure plate for engaging and disengaging the clutch disc with the flywheel; the clutch disc being disposed between the pressure plate and the flywheel; the clutch disc comprising friction lining means, the friction lining means for contacting the pressure plate and the flywheel during engagement of the clutch disc with the flywheel; means for biasing the pressure plate towards the clutch disc; the flywheel comprising: a first centrifugal mass connected to a crankshaft; a second centrifugal mass which is rotationally mounted on the first centrifugal mass and is rotationally connected to the first centrifugal mass by means of a damping device; the second centrifugal mass being connected to the friction clutch for the transmission of the torque; a bearing disposed between the two centrifugal masses for the mutual fastening of the two centrifugal masses; the second centrifugal mass comprising a first part and a second part; the first part acting as an output part of the damping device and being connected to the bearing; the second part comprising a friction surface for engaging with the friction clutch; the first part and the second part being fastened together by means of surfaces which essentially run radially; the first part and the second part, in their area of connection, are, by way of spacer elements, in contact with each other only in the vicinity of the connecting elements, and air cooling passages, which run essentially radially, are located circumferentially between the connecting elements.

BRIEF DESCRIPTION OF THE DRAWINGS

The present invention is explained in greater detail below with reference to the embodiments illustrated in the accompanying drawings, in which:

FIG. 1 shows the upper half of a longitudinal section through a flywheel with two centrifugal masses;

FIGS. 1b and 1c show enlarged details of the spacer elements of FIGS. 1 and 1a;

FIGS. 7a-7d show plan views of spacer rings manufactured separately;

FIGS. 7e and 7f show partial views of a spacer ring manufactured separately;

DESCRIPTION OF THE PREFERRED EMBODIMENT

Figure 1A:
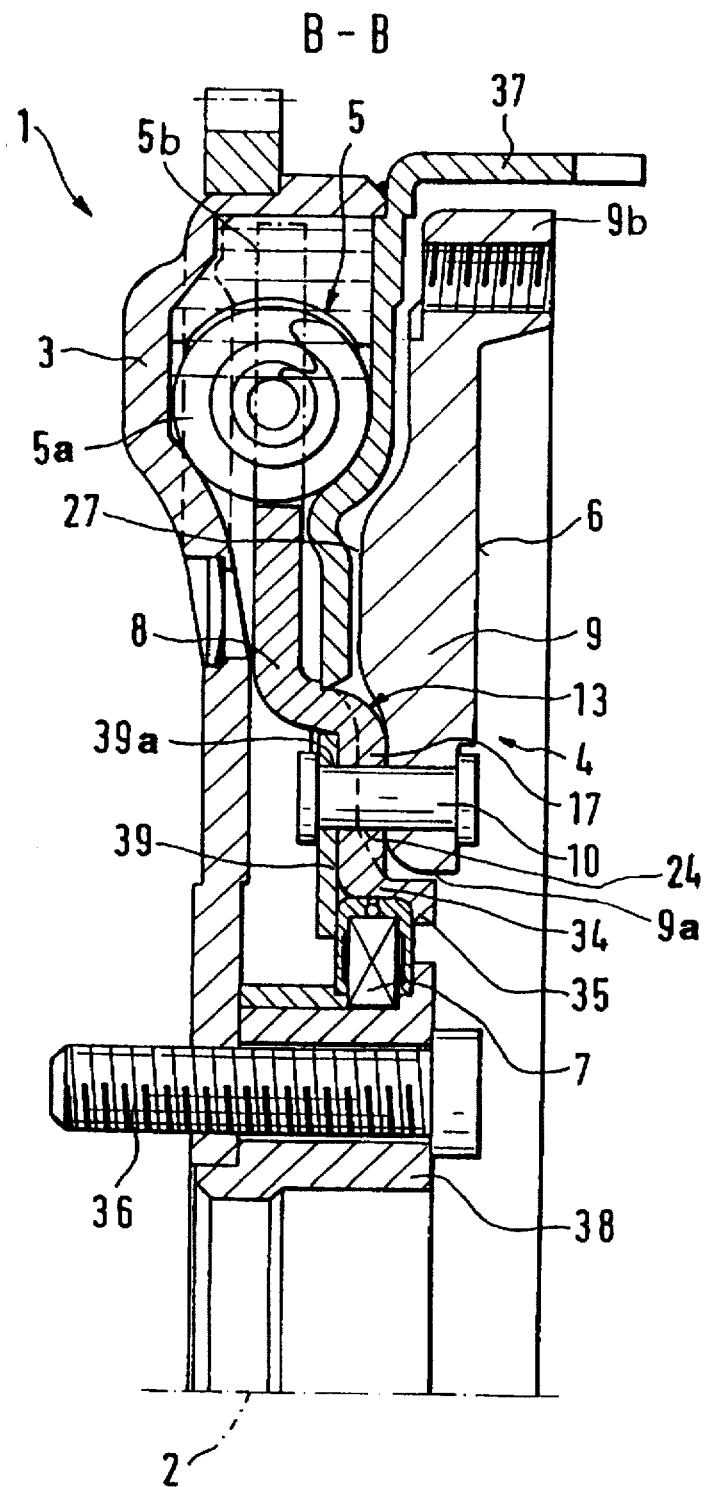
FIG. 1a shows a more detailed view of the flywheel of FIG. 1.

FIGS. 1 and 1a show a longitudinal section through the upper half of a flywheel 1. The flywheel 1 can have an axis of rotation 2, a first centrifugal mass 3, and a second centrifugal mass 4. The second centrifugal mass 4 can preferably include a first part 8 and a second part 9. In addition, the flywheel 1 can also include a cover 37 located between the first centrifugal mass 3 and the second centrifugal mass 4. Concentric to the axis of rotation 2, which is also the axis of rotation of a crankshaft (not shown here but see FIG. 8) of an internal combustion engine (see FIG. 8), the first centrifugal mass 3 can be fastened to the crankshaft by means of fastening screws 36.

The first centrifugal mass 3, in its radially outer area, together with the cover 37, can preferably form a torus in which a damping device 5 is located. The damping device 5 can be comprised of, for example, several springs 5a (see FIG. 1a), which springs 5a can be oriented approximately tangentially. The springs 5a can be actuated by the first centrifugal mass 3, and can be located in corresponding openings of the centrally oriented first part 8, to transmit torque to the first part 8. The first part 8 can be located axially between the first centrifugal mass 3 and the cover 37. The torus can be partly filled with a lubricant or damping medium 5b (see FIG. 1a). The first part 8 can be located radially inside the central opening formed through the cover 37, and can be axially deformed towards the second part 9 to achieve an axial separation from the first centrifugal mass 3. The first part 8 can then be essentially flat radially further inward, i.e. the first part 8 can be realized so that the first part 8 extends essentially perpendicular to the axis of rotation 2. Further radially inward from this flat part of the first part 8, there can preferably be a bearing 7.

In the radially inner area of the first part 8, the first part 8 can be provided with an axially oriented shoulder or flange 34, which shoulder 34 can be placed on the bearing 7. The bearing 7 can preferably be located between the first centrifugal mass 3 and the second centrifugal mass 4. The bearing 7 can also be fastened to the first centrifugal mass 3, namely by means of a shoulder 38. The shoulder 38 can preferably be fastened together with the fastening screws 36 and the first centrifugal mass 3 to the crankshaft (not shown here but see FIG. 8).

As mentioned above, the second centrifugal mass 4 is preferably comprised of both the first part 8 and the second part 9. The second part 9 can have a friction surface 6 for engaging and transmitting torque to a friction clutch (not shown here but see 40 in FIG. 1d). The second part 9 can be recessed in its radially inner area 9a (see FIG. 1a) so as to be guided past the shoulder 34 and at some distance therefrom. Second part 9 can also be firmly connected, radially inside the friction surface 6, with the flat and radial area of the first part 8 by means of connecting elements or rivets 10.

As shown in the enlarged illustrations of FIGS. 1b and 1c, and more specifically by the sectional view along line A—A shown in FIG. 1b, the first part 8 can thereby be configured so that, viewed in the circumferential direction, it is "corrugated" in the fastening area. Thus, the areas of the first part 8 which are in axial contact With the second part 9 can preferably function as spacer elements 17, while the areas of the second part 9 located circumferentially between these axial contact areas (i.e. spacer elements 17) can be at a greater axial distance from part 8, and thus air cooling passages 13 can be formed. The fastening parts or connecting elements 10 can thereby be located in the vicinity of the spacer elements 17, so that there can be direct contact between the first part 8 and the second part 9.

In these areas of direct contact between the first part 8 and the second part 9, there can be corresponding openings 24 (see FIGS. 1a and 1c) for the insertion of the connecting elements, in this case rivets 10. The air cooling passages 13 thus formed, which passages 13 preferably extend essentially radially, can make possible the passage of cooling air from radially inward to radially outward, and the cooling air can escape between the cover 37 and an outer area 9b (see FIG. 1a) of the second part 9. The heat transmission that takes place can thus be reduced to a significant extent due to the relatively small contact surface between the two parts 8, 9. The area around the bearing 7 can thereby be protected from the heat of friction of the friction clutch 40 (see FIG. 1d), which heat, with regard to the second part 9 or the second centrifugal mass 4, can proceed from the friction surface 6.

The axial fixing of the bearing 7 on the second centrifugal mass 4 can be achieved, on one hand, by an edge 35 which is formed radially inward on the shoulder 34, and, on the other hand, by a holding or retaining element 39 preferably located on the side of part 8 which faces away from the part 9. The holding element 39 can have several elements distributed on the circumference which can be simultaneously fastened by the rivets 10. In other words, and in accordance with one embodiment of the present invention, the holding element 39 can preferably have extensions or protrusions which can extend from an outer circumference of the element 39, and which extensions or protrusions can have openings 39a (see FIG. 1a) for receiving the rivets 10. However, in accordance with an additional embodiment of the present invention, the holding element 39 can have a continuous or uninterrupted outside circumference, and portions of the outside circumference can then have the holes 39a therein, for receiving the rivets 10.

FIG. 1c shows what could be considered to be a plan view of the first part 8 in the vicinity of a passage 13, and the axial section B—B shown in FIGS. 1 and 1a can be considered to be a section through the holes 24, which holes 24 are for receiving the rivets 10. Further, FIG. 1b can be considered to represent a view A—A of FIG. 1c, as mentioned above.

Figure 1D:
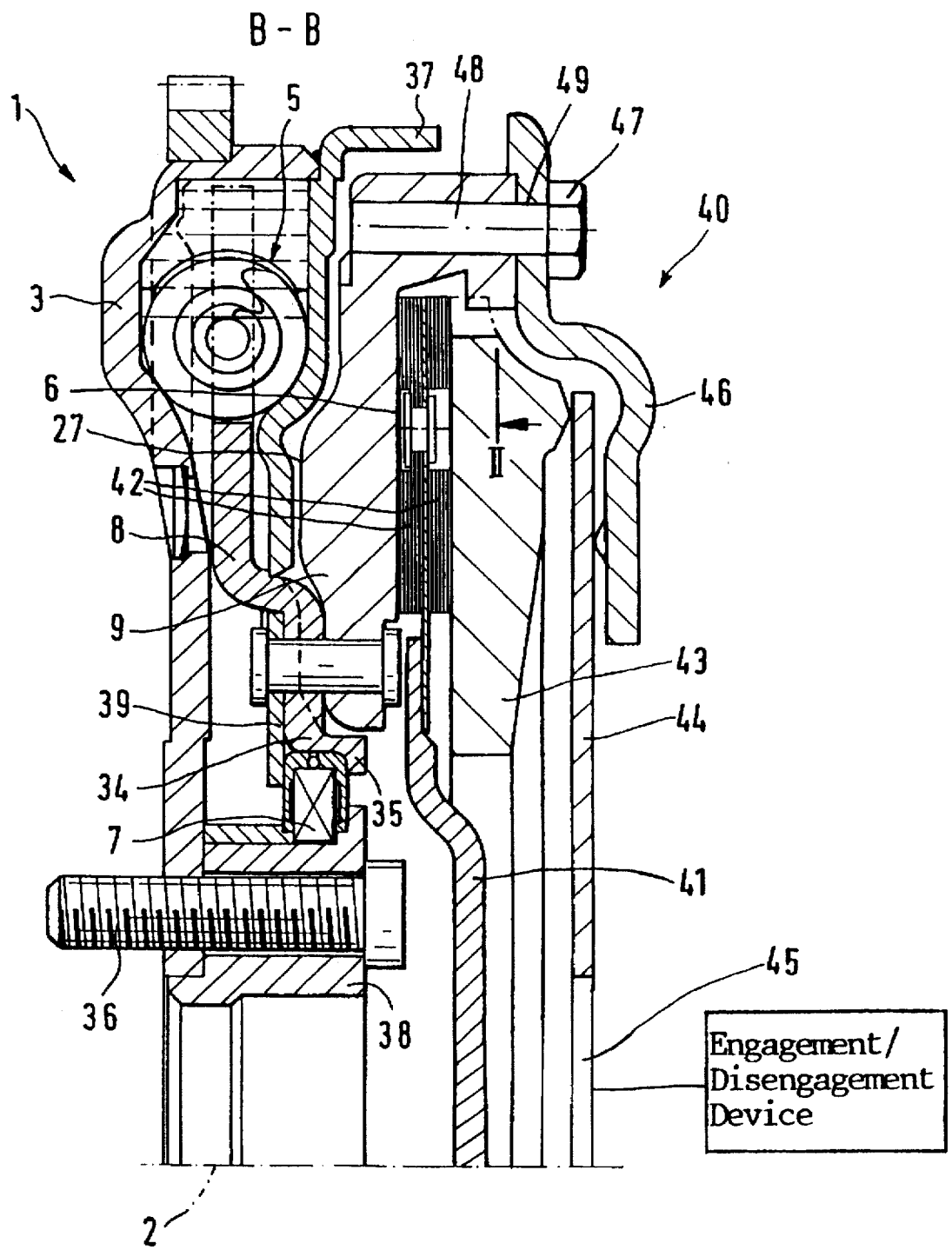
FIG. 1d shows the flywheel of FIGS. 1-1c in combination with a friction clutch.

FIG. 1d shows the flywheel 1 of FIGS. 1–1c in combination with a friction clutch 40. The friction clutch 40 can preferably include a clutch plate or disc 41, which clutch plate 41 can support friction linings 42 on an outer circumferential portion thereof. The friction linings 42 can preferably engage with the friction surface 6 of the second part 9. The clutch plate 41 can be axially movable, and can be engaged and disengaged with the flywheel 1 by means of a pressure plate 43, which pressure plate 43 can also be axially movable. The pressure plate 43 can also be biased by an application spring 44, which application spring 44 can preferably have a number of tongues 45 extending radially inwardly towards the axis of rotation 2. In addition, the tongues 45 can be actuated by means of an engagement/disengagement device, which device is shown schematically in FIG. 1d. Such devices will generally be well known to those of ordinary skill in the art and thus will not be discussed further here. A clutch housing 46 can be fastened to the flywheel 1 by means of a bolt 47, which clutch housing 46 can enclose the pressure plate 43 and clutch disc 41. The bolt 47 can be located in openings 48, 49 of the flywheel 1 and the housing 46, respectively.

It should be understood that the example of the friction clutch 40 described immediately hereinabove with reference to FIG. 1d can also be combined with the embodiments discussed hereinbelow, although not specifically shown with these embodiments.

Figure 2:
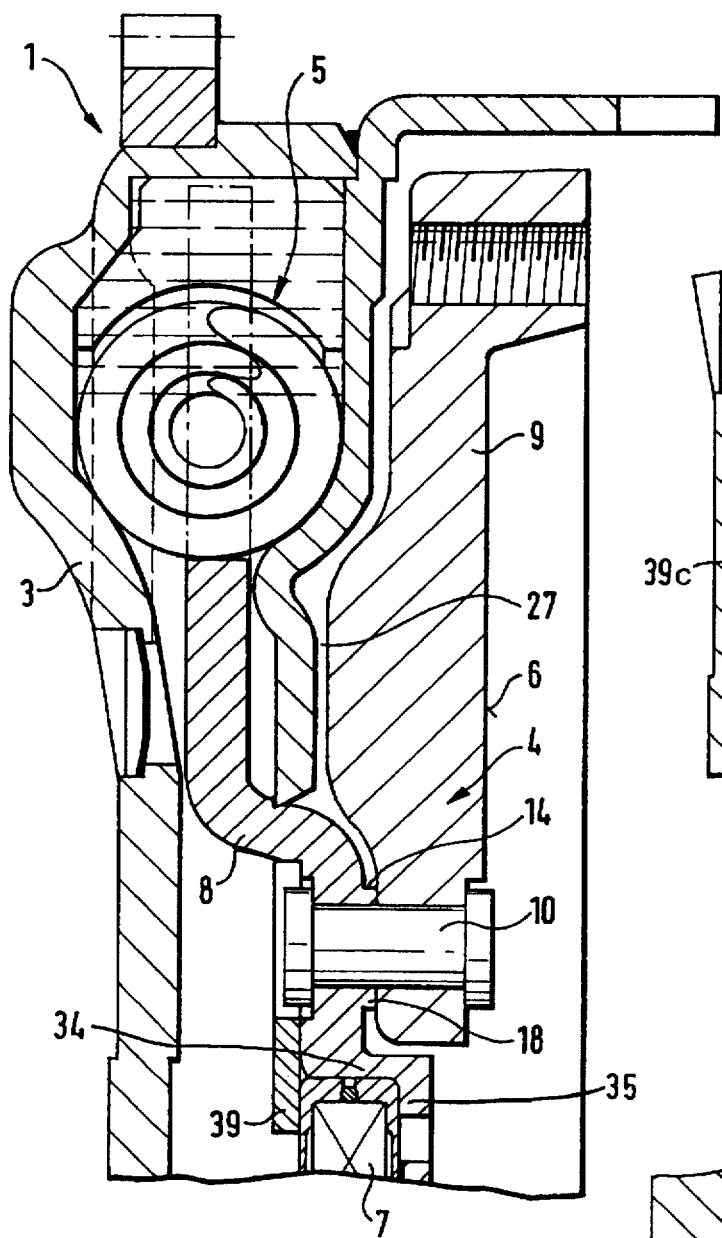
FIG. 2 shows the upper half of a cross-section through a flywheel with two centrifugal masses in another realization.
Figure 2B:
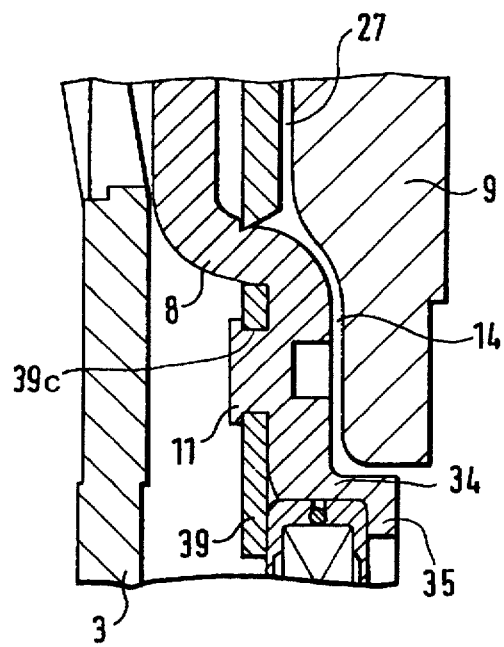
FIGS. 2b shows an additional view of the flywheel of FIG. 2.
Figure 2C:
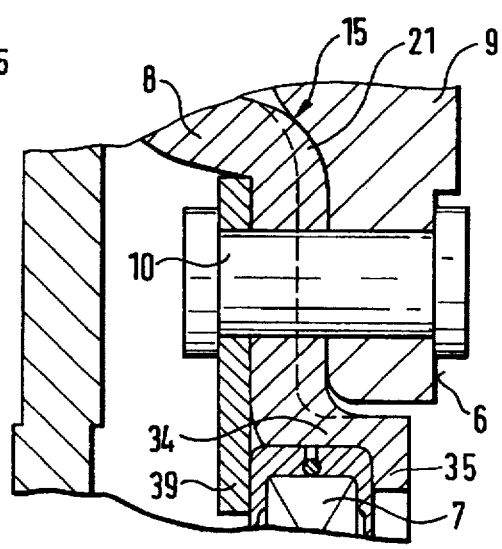
FIG. 2c shows a partial view of an additional embodiment of a flywheel.
Figure 2A:
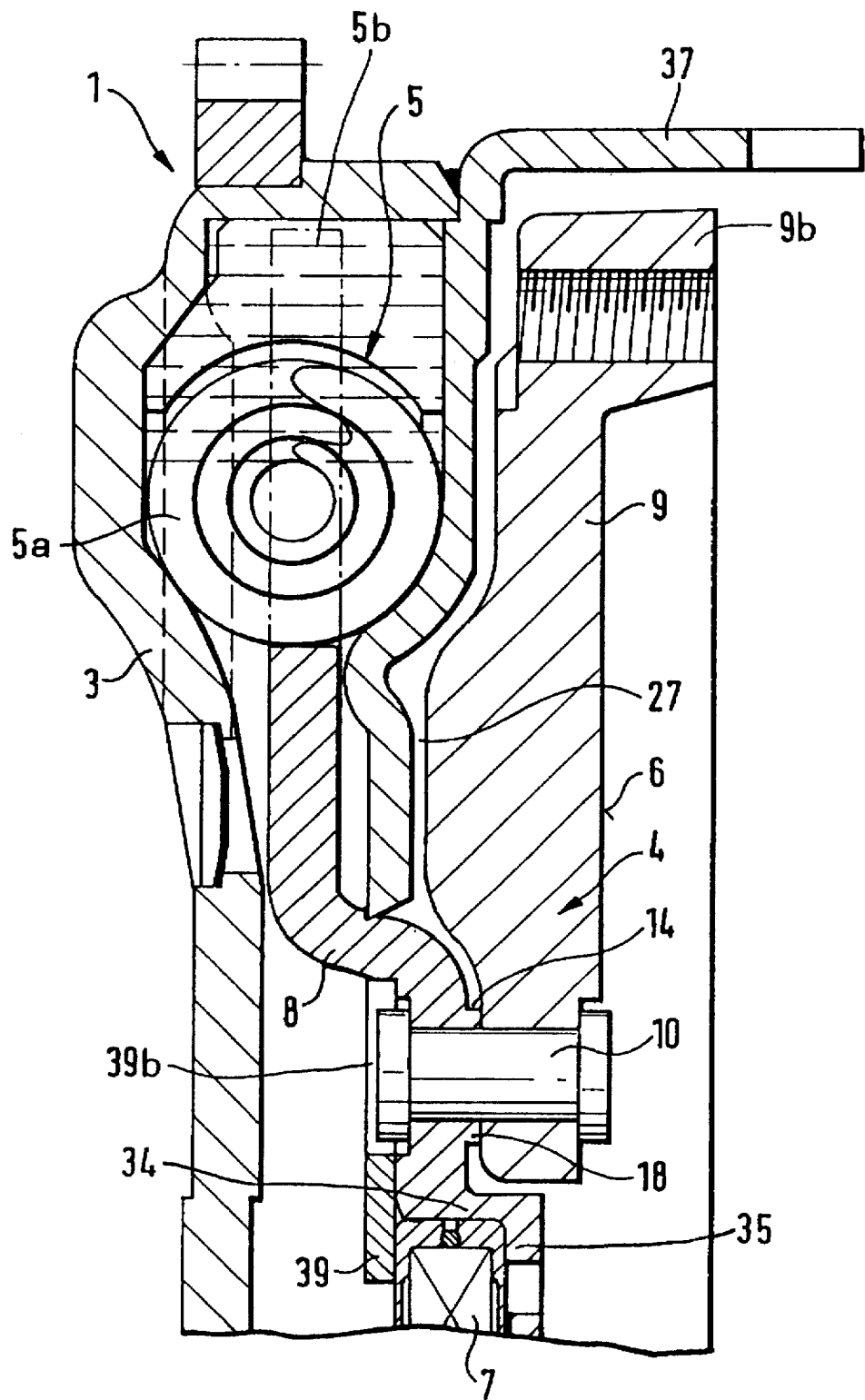
FIG. 2a shows a more detailed view of the flywheel of FIG. 2.

FIGS. 2 and 2a show a flywheel 1 with two centrifugal masses 3, 4, which flywheel 1 has the same general construction as the embodiment illustrated in FIGS. 1 and 1a, therefore, parts which are identical to those illustrated in FIGS. 1 and 1a are identified by the same reference numbers. The first part 8 of the second centrifugal mass 4, as in FIGS. 1 and 1a, can preferably be realized as a sheet metal part. However, in the fastening area (i.e. where the first part 8 is fastened to the second part 9), the first part 8 can have spacer elements 18 in the form of partial extrusions. In accordance with a preferred embodiment, the extrusions 18 can be formed by extruding portions of the first part 8 from the side of part 8 which faces away from part 9. In accordance with other embodiments, these extrusions 18 could also be considered to be protrusions or protuberances.

These extrusions 18 can be embodied by raised portions on the otherwise flat surface of the first part 8, against which raised portions the second part 9 can be in contact. The fastening of the first part 8 and the second part 9 to one another can be accomplished by rivets 10, which rivets 10 can extend essentially parallel to the axis of rotation 2. The partial spacer elements 18 can permit the formation of air cooling passages 14 (as can best be seen in FIGS. 2a and 2b) circumferentially therebetween, which passages 14 in turn can permit air cooling of the rear side of the second part 9.

The retaining element 39, in accordance with this particular embodiment, can preferably be realized as an encircling ring, and as shown in the enlarged detail in FIG. 2b, can be fastened by separate rivet extensions 11 which can extend away from the second part 9. In accordance with one embodiment, the view shown in FIG. 2b can be considered to be view of the first part 8 at a different circumferential point than that shown in FIGS. 2 and 2a, i.e. FIG. 2b shows a cross-section of the first part 8 through a rivet extension 11.

In accordance with one embodiment of the present invention, the rivet extensions 11 can preferably be formed from the first part 8, possibly by extrusions from the side of the first part 8 which faces the second part 9. Further, the rivet extensions 11 can preferably be disposed on the opposite side of the first part 8 from the extrusions 18, and possibly in an alternating manner with respect to the extrusions 18. Alternatively, the extensions 11 could possibly be separate from the first part 8, for example the extensions 11 could be glued or otherwise fastened to the first part 8. The extensions 11 can preferably extend into, or be received by openings 39c (see FIG. 2b) in the retaining or holding element 39. In addition, the retaining element 39 can also have, in accordance with one embodiment, recessed portions 39b (see FIG. 2a). Thus, one possible configuration of the retaining element 39 can have an inner circumference and an outer circumference, wherein there can be extensions protruding from the outer circumference, which extensions can have the openings 39c disposed therein. Therefore, the recessed portions 39b can be formed between two adjacent extensions, and the rivets 10 can be disposed in these recessed portions 39b.

A variant of the embodiment illustrated in FIGS. 2, 2a and 2b is illustrated in the detail in FIG. 2c. In accordance with this embodiment, in the first part 8, on its side facing the second part 9, in the area where the two parts are fastened to one another, there can be circumferential air cooling passages 15, whereby, for each two circumferentially alternating air cooling passages or channels 15, there can be fastening areas which function as spacer elements 21. In this fastening area, the second part 9 can be in contact with the first part 8, and can be fastened to the first part 8 by rivets 10. At the same time, the retaining element 39 in the form of an encircling sheet metal part is fastened by the same rivets 10. The cooling air passages 15 can thereby be drawn radially inward so that it is possible for cooling air to pass between the inside diameter of the second part 9 and the shoulder 34 for the fastening of the bearing 7.

Figure 3:
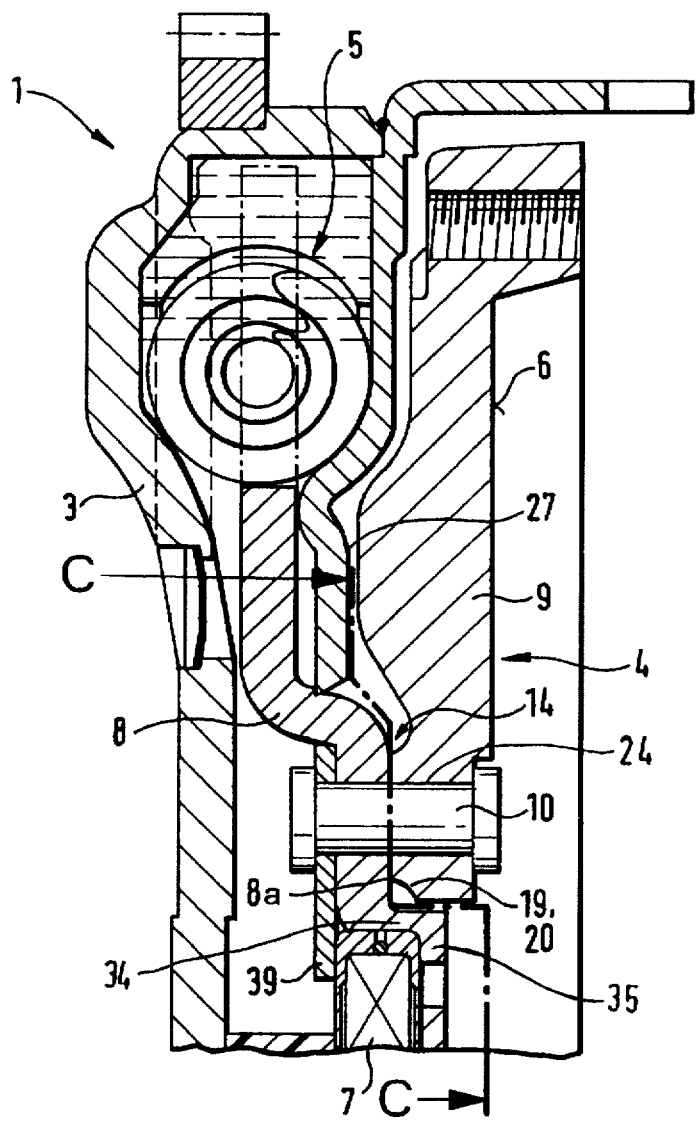
FIG. 3 shows an additional partial longitudinal section through a variant of a flywheel with two centrifugal masses.
Figure 3A:
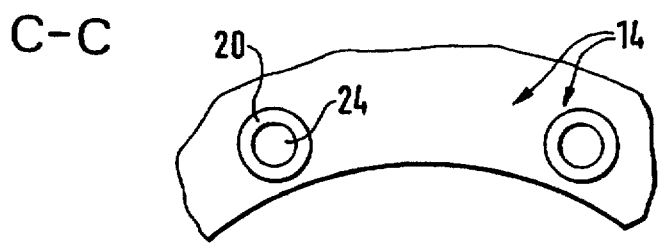
FIGS. 3a and 3b show plan views of two embodiments of the spacer element of FIG. 3.
Figure 3B:
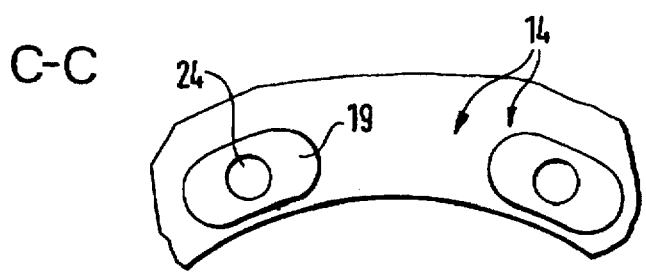

FIG. 3 illustrates a flywheel 1 with two centrifugal masses 3, 4 in which, in contrast to the embodiments illustrated in FIGS. 1, 1a, 2, 2a, and 2c, the spacer elements 19 and 20 can preferably be located on the second part 9 of the second centrifugal mass 4, and can be in the form of raised portions which extend towards the first part 8. The two details shown in FIGS. 3a and 3b each show a plan view, along line C—C in FIG. 3, of different embodiments of the spacer elements, whereby FIG. 3a shows essentially circular contact surfaces of the spacer elements 20 around the rivet hole 24, and FIG. 3b shows circumferentially elongated contact surfaces of the spacer elements 19. In both cases, these surfaces of the spacer elements 19, 20 can be in contact with corresponding flat opposite surfaces 8a of the radially inner area of the first part 8. The surfaces of the spacer elements 19, 20 and the flat surfaces 8a can be brought into essentially permanent contact with one another by means of rivets 10. These rivets 10 can also simultaneously fasten a retaining element 39 for the guidance of bearing 7. Circumferentially between the spacer elements 19 and 20, there can be air cooling passages 14 which permit the flow of cooling air from radially inward to radially outward, on the rear side of the friction surface 8 of the second part 9. The other components of the flywheel 1 with two centrifugal masses shown in FIG. 3 are essentially identical to those described above, and will therefore not be discussed further here.

Figure 4:
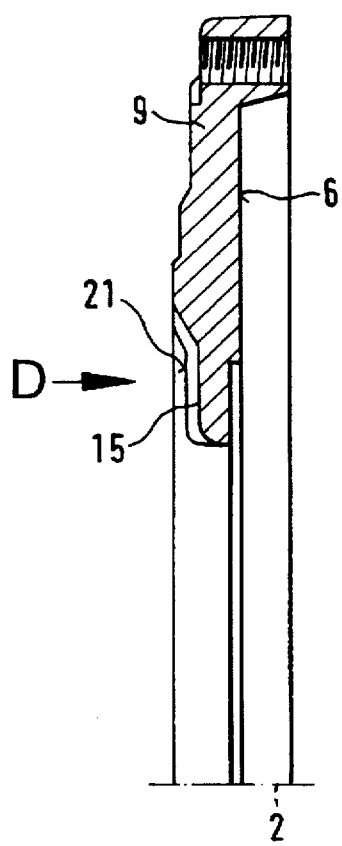
FIG. 4 shows a partial view of a second centrifugal mass with special air cooling passages.
Figure 4A:
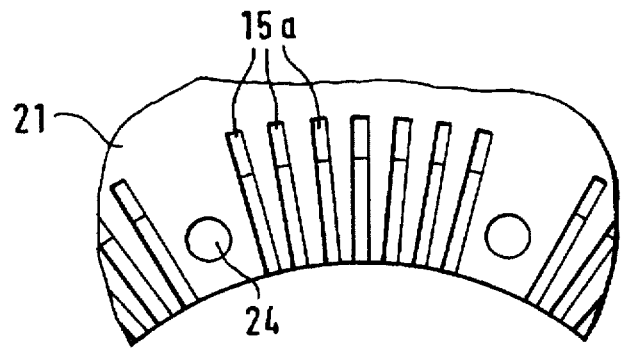
FIGS. 4a-4c show various embodiments of the air cooling passages of FIG. 4.
Figure 4B:
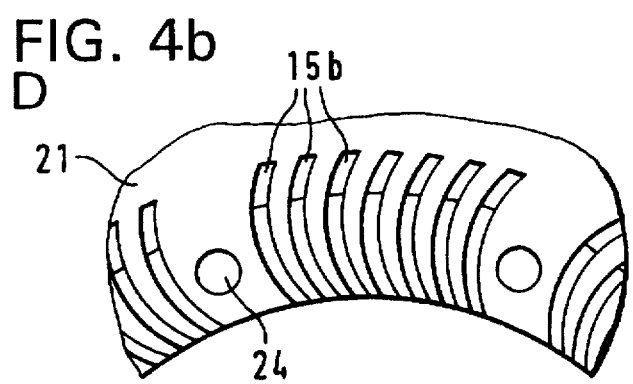
Figure 4C:
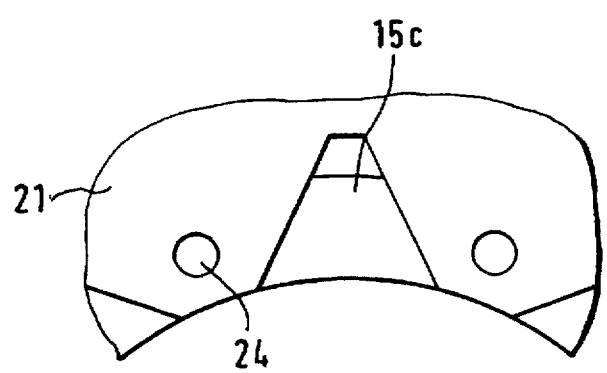

FIG. 4 illustrates a partial view of the second part 9 of a flywheel with two centrifugal masses (not shown here for purposes of simplicity), in which, on the side of the second part 9 which faces the first part 8, there can be air cooling passages 15. The passages 15 can extend essentially radially, and can be distributed circumferentially in groups so that sufficient areas can be left free for the realization of spacer elements 21. The rivet holes 24 are located in these areas, i.e. in the spacer elements 21. The air cooling passages can preferably have different shapes as illustrated in FIGS. 4a, 4b and 4c, which figures can be considered to show a view of the spacer element 21 according to arrow D in FIG. 4. The shape illustrated in FIG. 4a shows air cooling passages 15a which run essentially purely radially, which project like rays from the axis of rotation 2. In other words, and in accordance with one embodiment, the passages 15a can preferably be straight passages.

FIG. 4b shows air cooling passages 15b which are curved and which, due to their scoop shape, can have a favorable effect on the amount of air transported. For example, in accordance with one embodiment, the curved passages 15b may be able to transport larger amounts of air. Yet another embodiment is shown in FIG. 4c, wherein an air cooling passage 15c can be located circumferentially between two adjacent rivet holes 24. The passage 15c can preferably have a trapezoidal shape, whereby the circumferential sides are at a greater distance from one another radially inward, and at a lesser distance from one another radially outward, to thereby accelerate the flow of cooling air. In other words, and in accordance with one embodiment, the passages 15c shown in FIG. 4c can have a generally triangular shape.

In accordance with one embodiment, each of the passages 15a, 15b, and 15c shown in FIGS. 4a, 4b, and 4c, respectively, can have an inner portion and an outer portion, the inner portion being disposed nearer to the axis of rotation 2 than the outer portion. The outer portion can preferably be axially offset with respect to the inner portion in each of the passages 15a, 15b, 15c, that is, the outer portion can be disposed axially closer to the first part 8 than the inner portion.

It should be understood that the view shown in FIG. 4 is only a partial view, as mentioned above, and that the surrounding structures would essentially be the same as that discussed above with regard to the embodiments discussed above.

Figure 5:
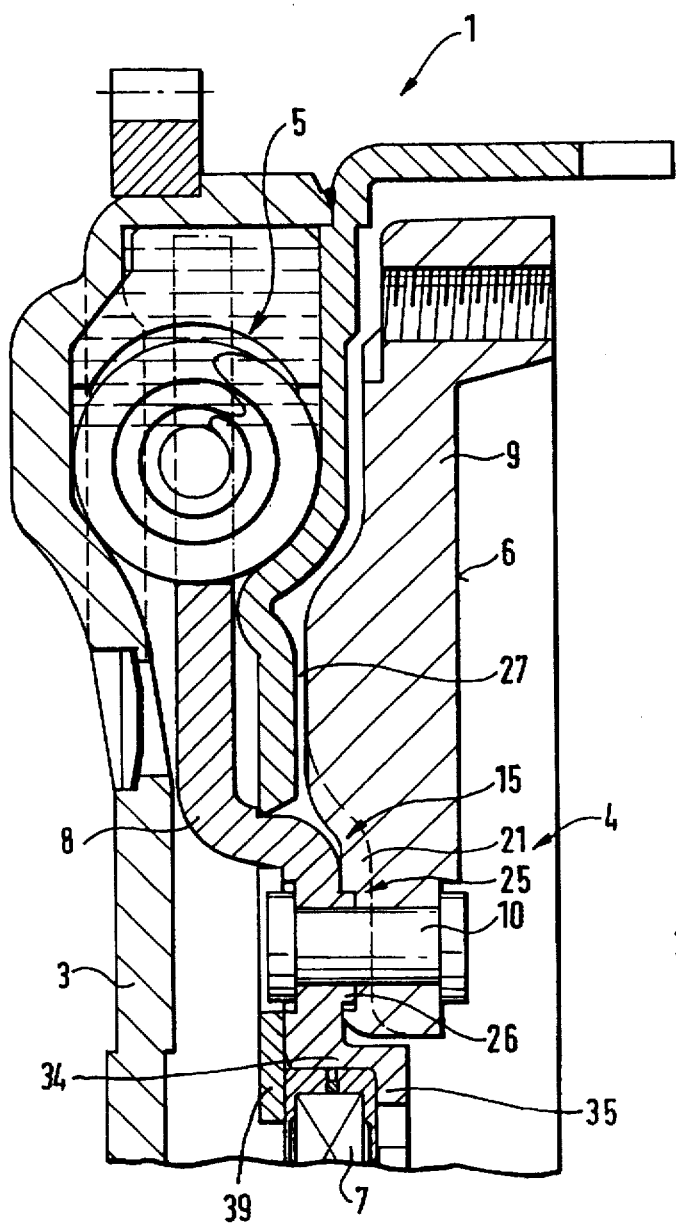
FIG. 5 shows an additional variant of a flywheel with two centrifugal masses, with a centering groove.
Figure 5B:
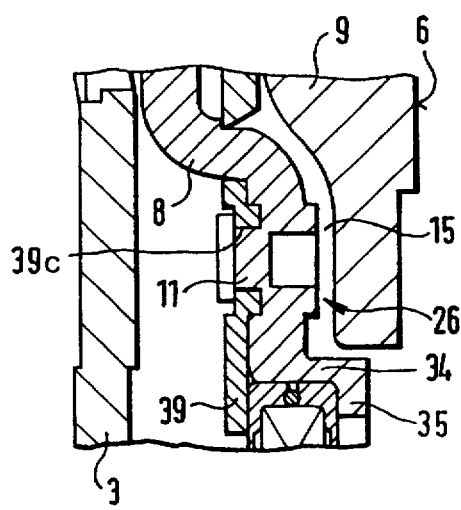
FIG. 5b shows an additional view of the flywheel of FIG. 5.
Figure 5A:
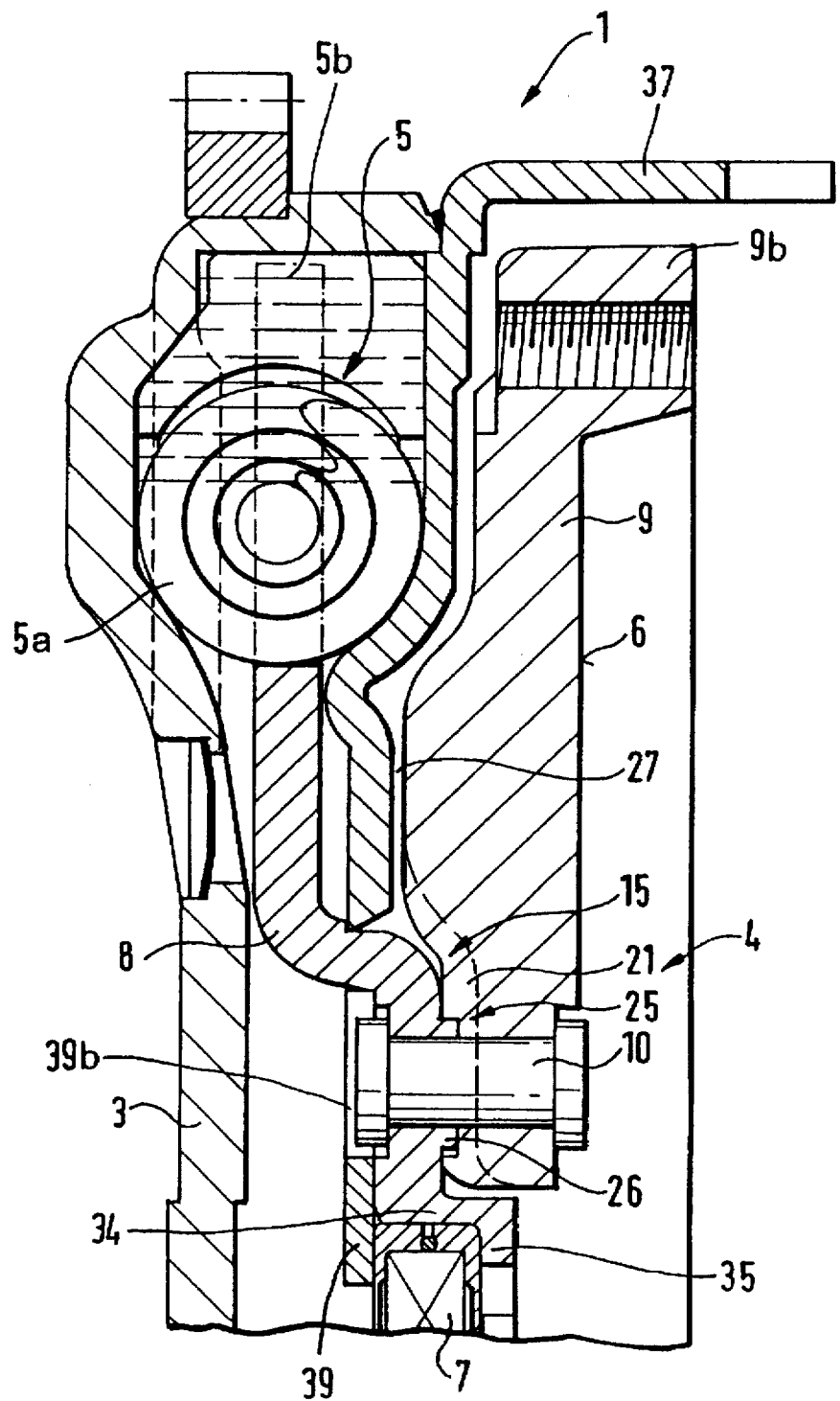
FIG. 5a shows a more detailed view of the flywheel of FIG. 5.

The illustration of a flywheel 1 with two centrifugal masses in FIGS. 5 and 5a show a realization of air cooling passages 15 similar to that shown in FIG. 4, in that the air cooling passages 15 can be located in the second part 9. However, in the design illustrated in FIGS. 5 and 5a, there can preferably be an encircling groove 25 concentric to the axis of rotation 2 in the fastening area of the second part 9. In addition, there can be a centering extension 26 on the first part 8, which centering extension 26 preferably projects towards the second part 9. This groove 25, in connection with the centering extension 26, can permit a radial centering of the two parts 8 and 9 with respect to one another. The centering extension 26 of the first part 8 can thereby extend from the first part 8 in the vicinity of the spacer elements 21 of the second part 9. The air cooling passages 15 (as best seen in the detail of FIG. 5b) can be realized so that the passages 15 are axially deeper than the projecting portion of the centering extension 26. It thereby becomes possible, in spite of the essentially continuous encircling centering extension 26, to have radially continuous cooling air passages 15. FIG. 5b, which can be considered to show the first part 8 at a different circumferential point than shown in FIGS. 5 and 5a, also shows that rivet extensions 11 can be made in the first part 8. The rivet extensions 11 can be introduced into the first part 8 through extrusions from the side of the first part 8 which faces the second part 9. The rivet extensions 11 can preferably provide the fastening of the retaining element 39.

In accordance with one embodiment, as described above with reference to FIGS. 2, 2a and 2b, retaining element 39 can have openings 39c (see FIG. 5b) for receiving the rivet extensions 11. Further, the retaining element 39 can be configured to have an inside and outside circumference, the outside circumference having extensions wherein the openings 39c can be located. In addition, there can preferably be openings or recesses 39b (see FIG. 5a) which can be located between two neighboring extensions. Of course, other configurations of the retaining element 39 can be possible within the scope of the present invention.

The other components of the flywheel 1 with two centrifugal masses 3, 4 as shown in FIGS. 5, 5a and 5b are essentially identical to those described above, and will therefore not be discussed further here.

Figure 6:
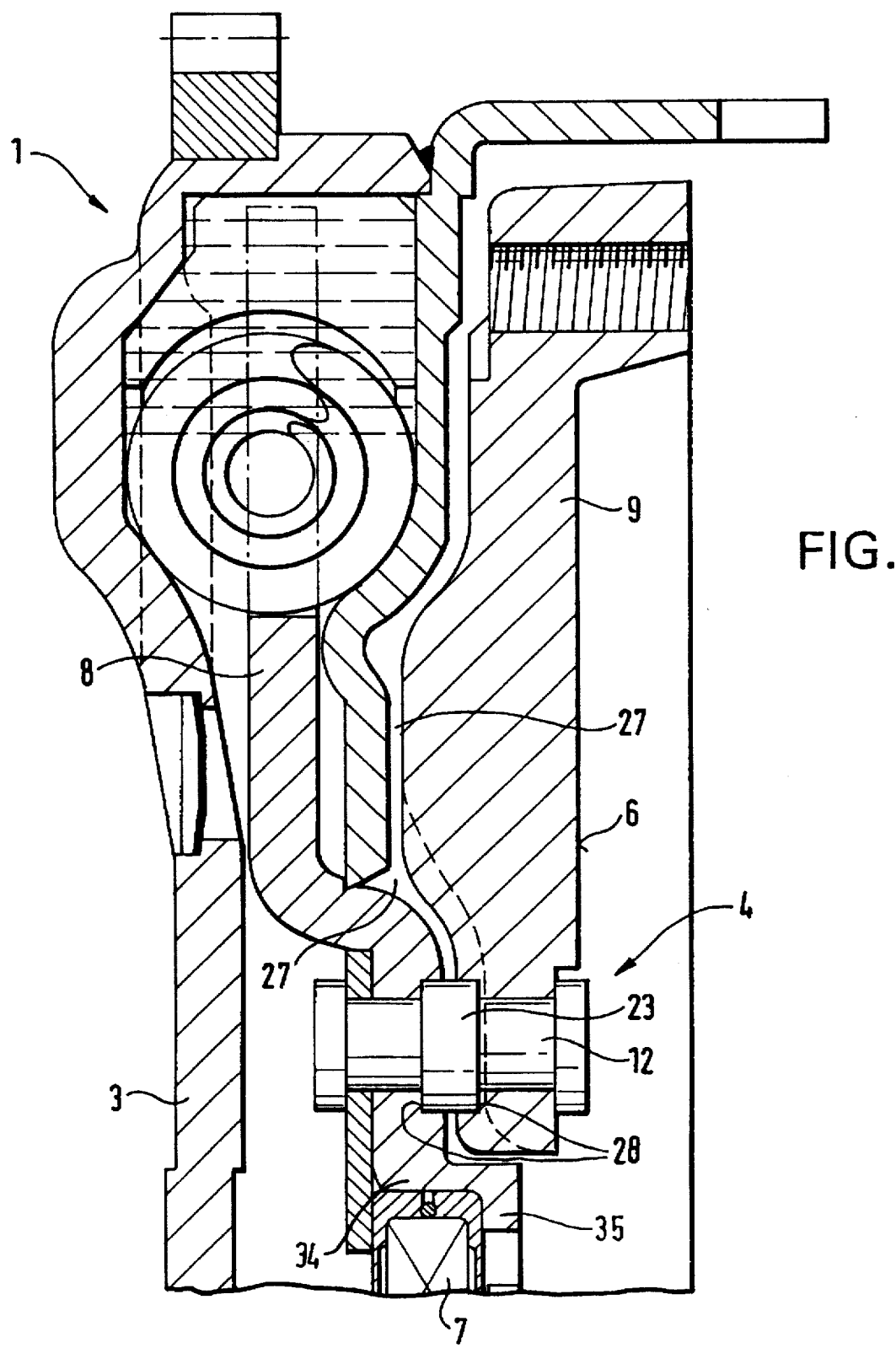
FIG. 6 shows a flywheel with two centrifugal masses with integration of the spacer elements into the connecting elements.
Figure 6A:
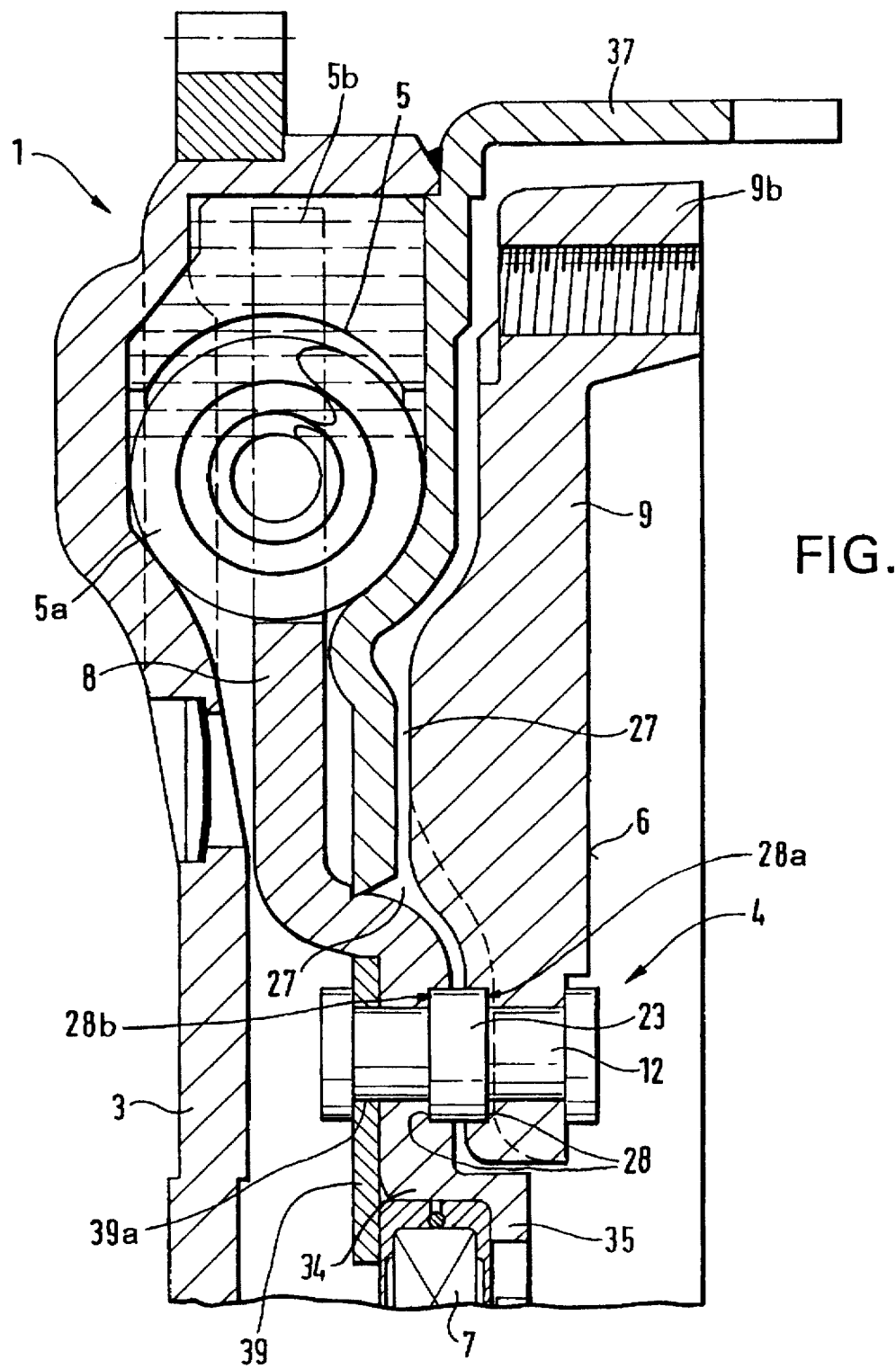
FIG. 6a shows a more detailed view of the flywheel of FIG. 6.

FIGS. 6 and 6a illustrate a flywheel 1 with two centrifugal masses 3, 4, in which the spacer elements 23 can preferably be part of the connecting elements, which connecting elements can be in the form of rivets 12, for example. These rivets 12 can have an enlarged diameter in their middle section (viewed in the axial direction), and can be provided with a stop edge 28 (see FIG. 6a) on both sides. In other words, the spacer elements 23 can be embodied by an enlarged middle section of the rivets 12. The stop edges 28 can be designed in the form of circular rings and can be partly submerged both in the first part 8 and in the second part 9 in corresponding recesses. Thus, in accordance with a preferred embodiment, the first part 8 can have a recess 28b (see FIG. 6a) in which one stop edge 28 can be disposed, and the second part 9 can have a recess 28a (see FIG. 6a) in which the opposite stop edge 28 can be disposed. Thus, independently of the rivet shanks of the rivets 12, an essentially exact radial correspondence between the second part 9 and the first part 8 can preferably be achieved. Between the two parts 8 and 9, there remains a gap in the axial direction, and air cooling passages 15 can be introduced into the second part 9, similar to that shown in FIGS. 4–4c.

In accordance with one embodiment, the flywheel 1 shown in FIGS. 6 and 6a can also preferably have a retaining element 39 which can be simultaneously fastened to the first part 8 by means of the rivets 12. Thus, there can preferably be openings 39a (see FIG. 6a) in the retaining element 39 for receiving the rivets 12. The remaining components of the flywheel 1 shown in FIGS. 6 and 6a are essentially the same as that discussed above with reference to previous embodiments, and will therefore not be discussed further here.

Figure 7G:
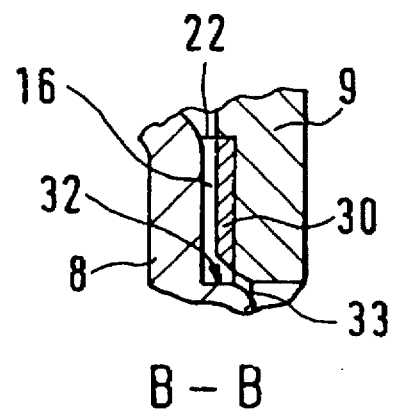
FIGS. 7g and 7h show more detailed views of the spacer rings of FIGS. 7e and 7f, respectively.
Figure 7H:
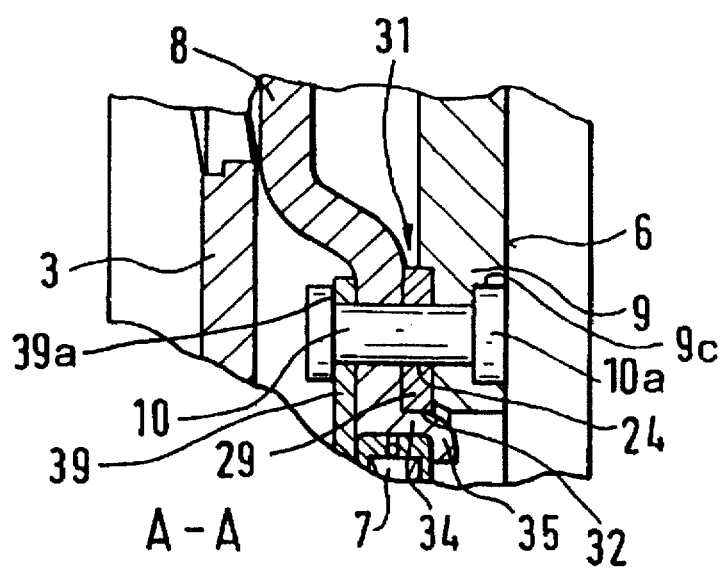

Additional variants for fastening the two parts 8 and 9 of a flywheel with two centrifugal masses to one another to permit the passage of cooling air is illustrated in FIGS. 7–7h. In accordance with these embodiments, the spacer elements 22 can preferably be designed as a separate component from the first part 8, the second part 9, and the rivets 12. In this case, all the spacer elements 22 can be located on a common spacer ring 29. The Spacer ring 29 can thereby include an essentially continuous encircling backing or carrier ring 30. The carrier ring 30 can be concentric to the axis of rotation, and several axially projecting spacer elements 22 can be distributed on the circumference of the ring 30. The passage openings for the rivets 10 can be located at 24, each in the vicinity of a spacer element 22. Circumferentially between each pair of spacer elements 22, therefore, an air cooling passage 16 can be left open, which passage 16 permits the passage of cooling air behind the friction surface 6 of the second part 9.

In accordance with one embodiment, the spacer ring 29 can be comprised of non-ferrous material suitable for use at high temperatures. However, it can also be possible to manufacture the ring 29 as an aluminum injection molding. The spacer ring 29, as illustrated in the details of FIGS. 7e and 7g, can also be assembled from individual sheet metal elements, whereby the backing or carrier ring 30 can preferably be realized in one piece, and the spacer elements 22 can be manufactured individually and attached to the backing or carrier ring 30, for example by spot welding. In accordance with an alternative embodiment of the present invention, the spacer elements 22 could be formed from, or be integral with, the ring 30. As can best be seen in FIGS. 7f and 7h, the spacer ring 29 can also function as a fixing device, in the radial direction, for the two parts 8 and 9. For this purpose, the spacer ring 29, with its backing or carrier ring 30, can be inserted essentially directly into the second part 9, namely with its outside circumference in a corresponding centering shoulder 31. In accordance with one embodiment of the present invention, centering shoulder 31 (as can best be seen in FIG. 7h) can preferably define a circular recess in part 9, into which recess the spacer ring 29 can be inserted. On the side of part 9 which is opposite the part 8, the backing or carrier ring 30 can guided with along its inside diameter on the outside diameter of a shoulder 34, Which shoulder 34 can be formed by the radially inner area of the first part 8, to locate the bearing 7. In other words, and in accordance with one embodiment, the inside diameter of the spacer ring 29, at the spacer elements 22, can preferably be guided on an outside diameter 32 of shoulder 34. To realize passage openings for cooling air at this point, the backing or carrier ring 30 can be shortened from the radial inside, circumferentially between the spacer elements 22 (i.e. the carrier ring 30 has a larger inside diameter at these points), and at this point the carrier ring can also have a bevel 33. In addition, in accordance with one embodiment, the second part 9 can have recessed portions 9c (see FIG. 7h) into which the heads 10a (see FIG. 7h) of the rivets 10 can be inserted.

FIGS. 7a–7d can be considered to illustrate, in plan view, various possible configurations of the spacer ring 29, and FIGS. 7e and 7g can be considered to represent partial views of the ring 29 and surrounding components along line B—B of FIG. 7a. Further, FIGS. 7f and 7h can be considered to represent partial views of the ring 29 and surrounding components along line A—A of FIG. 7a. FIG. 7a shows a spacer ring 29 wherein the carrier ring 30 has a beveled portion 33, as discussed above, and wherein the air cooling passages have wall portions (i.e. the side portions of two adjacent spacer elements 22) which are angled outwardly, away from one another. FIG. 7b shows a spacer ring 29 wherein the carrier ring 30 also has a beveled portion 33, and wherein the air cooling passages 16 have two essentially parallel side walls. FIG. 7c shows a spacer ring 29 which has a carrier ring 30 with a beveled portion 33 and wherein the passages 16 have wall portions which are angled inwardly, towards one another. Lastly, FIG. 7d shows a spacer ring 29 which does not have a beveled portion 33, and which has air cooling passages 16 with two essentially parallel side walls. Of course, other configurations of the spacer ring 29 are conceivably, within the scope of the present invention.

It should be understood that the views shown in FIGS. 7a–7h are essentially only partial views, and that the surrounding components can be essentially the same as in the embodiments discussed hereinabove.

As shown in essentially all of the figures, there can preferably be a continuous gap 27 formed between the second part 9 of the second centrifugal mass 4 and the cover 37, which gap 27 can transport the cooling air, which cooling air can flow in through the cooling air passages 13–16, and then radially outwardly.

Figure 8:
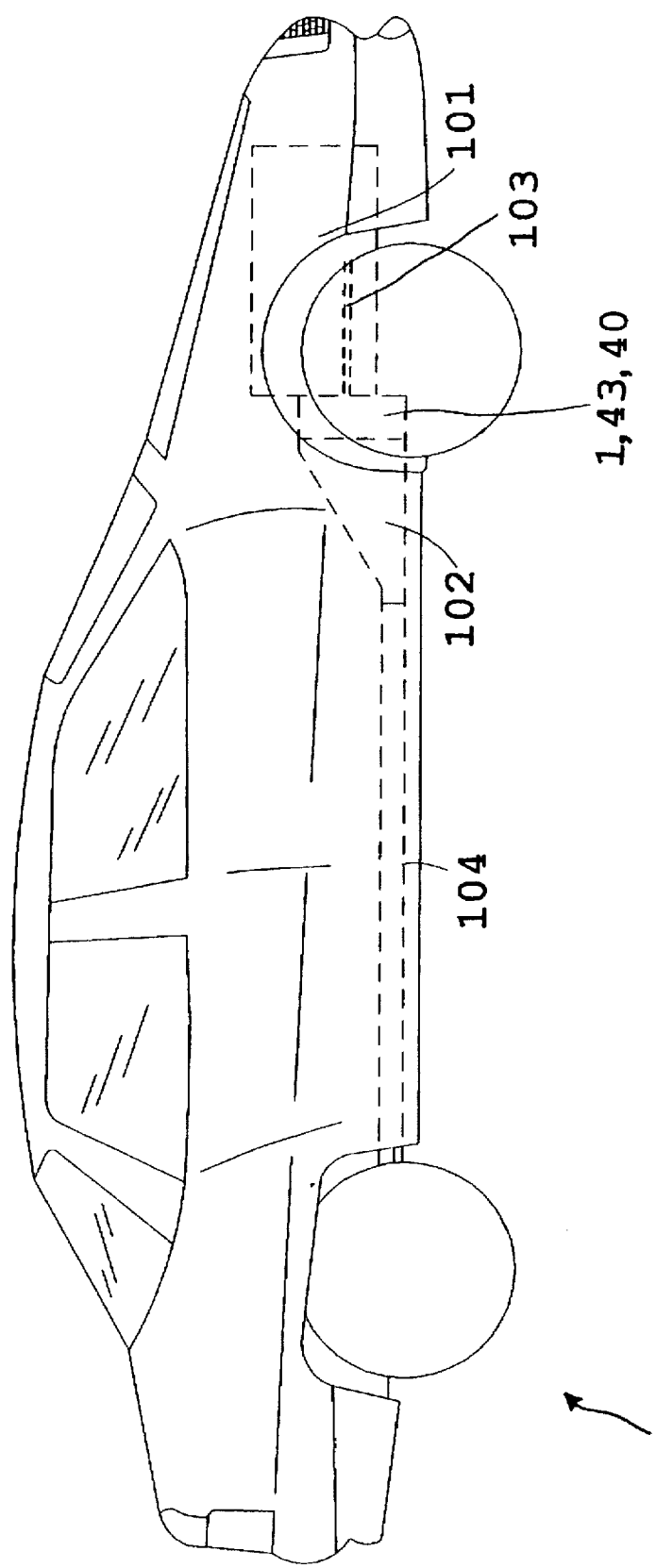
FIG. 8 shows a typical automobile that can incorporate the present invention.

FIG. 8 shows what could be considered to be a typical automobile or motor vehicle 100, which automobile 100 can include an internal combustion engine 101, which engine 101 can be mounted in a forward portion of the automobile 100. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via a drive shaft 104. If the automobile 100 has a manual transmission 102, the flywheel 1, pressure plate 43, and clutch disc 40 of the present invention may also be included for engaging the transmission 102 with the engine 101.

One feature of the invention resides broadly in the flywheel with two centrifugal masses for an internal combustion engine, comprising a first centrifugal mass connected to the crankshaft, which centrifugal mass defines an axis of rotation, a second centrifugal mass which is rotationally mounted on the first centrifugal mass and is rotationally connected to the first centrifugal mass by means of a damping device, a friction clutch connected to the second centrifugal mass for the transmission of the torque, which clutch has a friction surface on the driven side of the second centrifugal mass, and a bearing between the two centrifugal masses for the mutual fastening of the two centrifugal masses, whereby the second centrifugal mass is composed of two parts, the first of which acts as an output part of the torsion damper device and is connected to the bearing, and the second of which has the friction surface, and the two parts are screwed or riveted together by means of surfaces which essentially run radially, characterized by the fact that both of the two parts 8, 9, in their area of connection, are, by way of spacer elements 17–23, in contact with each other only in the vicinity of the connecting elements screws, rivets 10, 11, 12, and air cooling passages 13–16, which run essentially radially, are located circumferentially between the connecting elements.

Another feature of the invention resides broadly in the flywheel with two centrifugal masses characterized by the fact that the spacer elements 17–21 are an integral part of at least one of the two parts 8, 9 of the second centrifugal mass 4.

Yet another feature of the invention resides broadly in the flywheel with two centrifugal masses characterized by the fact that the spacer elements 17 are formed by the first part 8, in that the part 8 manufactured of sheet metal is corrugated in the vicinity of the connecting elements 10 both circumferentially and concentric with respect to the axis of rotation 2, with areas spacer elements 17 projecting alternately from the plane toward the second part 9, with flat contact surfaces opposite the second part 9, which contact surfaces are penetrated by openings 24 for the location of the connecting elements, e.g. rivets 10.

Still another feature of the invention resides broadly in the flywheel with two centrifugal masses characterized by the fact that the spacer elements 18 are formed by the first part 8, being designed as a sheet metal part, in that individual areas on a common diameter concentric to the axis of rotation 2 are realized in the form of extrusions in the first part 8, having been pressed through the first part 8 from that side of the first part 8 farther away from the second part 9, the extrusions being in contact with flat contact surfaces on the second part 9, the extrusions being penetrated by openings 24 for connecting elements, e.g. rivets 10.

A further feature of the invention resides broadly in the flywheel with two centrifugal masses characterized by the fact that the spacer elements 19, 20 are formed by the second part 9, in that on the second part, on a common diameter concentric to the axis of rotation 2, there are axially raised portions directed toward the first part 8 with flat contact surfaces for the first part, the flat contact surfaces being penetrated by openings 24 for the connecting elements, such as rivets 10, which extend into the first part 8.

Another feature of the invention resides broadly in the flywheel with two centrifugal masses characterized by the fact that the spacer elements 21 are formed by the first part 8, in that the first part is divided circumferentially at least in the connection area and has air cooling passages 15 which run essentially radially, in that individual areas located between the air cooling passages 15 are penetrated by openings 24 for connecting elements, such as rivets 10, which extend into the second part 9.

Yet another feature of the invention resides broadly in the flywheel with two centrifugal masses characterized by the fact that the spacer elements 19–21 are formed by the second part 9, in that the second part, at least in the connecting area, has air cooling passages 15 which run essentially radially and are distributed over the circumference, and individual areas located between the air cooling passages 15 are penetrated by openings 24 for the connecting elements, such as rivets 10, which extend into the first part 8.

Still another feature of the invention resides broadly in the flywheel with two centrifugal masses characterized by the fact that the areas are provided with an encircling groove 25, the outside diameter of which is larger and the inside diameter of which is smaller, than the outside and inside envelope, respectively, of the connecting elements rivet shank of rivet 10 and a centering extension 26 of the first part 8 extends into this groove 25.

A further feature of the invention resides broadly in the flywheel with two centrifugal masses characterized by the fact that the spacer elements are part of the connecting elements 12, in that the latter, between their terminal areas, each have a stop area 23 with a corresponding axial length for the two parts 8, 9, with an enlarged diameter for the formation of one stop edge 28 each, and a corresponding gap 27 between the two parts 8, 9.

Another feature of the invention resides broadly in the flywheel with two centrifugal masses characterized by the fact that the connecting elements are designed as rivets 12, with a stop area 23 which has an enlarged diameter.

Yet another feature of the invention resides broadly in the flywheel with two centrifugal masses characterized by the fact that the stop areas 23 in the two parts 8, 9 are partly immersed or submerged in corresponding centering recesses.

Still another feature of the invention resides broadly in the flywheel with two centrifugal masses characterized by the fact that, in addition to the gap 27 between the two parts 8, 9, there are air cooling passages 15 which run essentially radially, preferably in the second part 9, and are located circumferentially between the connecting elements 12.

A further feature of the invention resides broadly in the flywheel characterized by the fact that the spacer elements 22 are combined into a separate spacer ring 29 which is oriented concentric to the axis of rotation 2, and the spacer ring 29 is penetrated by the connecting elements, e.g. in the form of rivets 10.

Another feature of the invention resides broadly in the flywheel characterized by the fact that the spacer ring 29 consists of an encircling, continuous carrier ring 20, from which individual spacer elements 22 project in the axial direction, namely in the vicinity of the connecting elements rivets 10.

Yet another feature of the invention resides broadly in the flywheel characterized by the fact that the spacer ring 29 is fastened, in the vicinity of the outside diameter of the carrier ring 30, to a centering shoulder 31 of the second part 9, and is also engaged on a centering shoulder 32 on the first part 8.

Still another feature of the invention resides broadly in the flywheel characterized by the fact that the first part 8, radially inside the connecting elements 10, is axially angled toward the second part 9, and forms a shoulder 34 which locates the bearing 7.

A further feature of the invention resides broadly in the flywheel with two centrifugal masses characterized by the fact that the fastening of the bearing 7 in the direction of the second part 9 is realized by means of an edge 35 which points radially inward of the shoulder 34, and the fastening in the opposite direction is realized by one or more retaining elements, the one or more retaining elements being held by the connecting elements.

Another feature of the invention resides broadly in the flywheel with two centrifugal masses characterized by the fact that the first part 8, radially inside the spacer ring 29, is axially angled in the direction away from the second part 9 and, for the purpose of centering the spacer ring 29, forms, on the side opposite the carrier ring 30, a shoulder 34 with a centering shoulder 32.

Yet another feature of the invention resides broadly in the flywheel characterized by the fact that the carrier ring 30 is shortened circumferentially from the radial inside between the spacer elements 22, and may also be provided with a bevel 33.

Still another feature of the invention resides broadly in the flywheel with two centrifugal masses characterized by the fact that the spacer ring 29 is made of high-temperature, non-ferrous material.

A further feature of the invention resides broadly in the flywheel with two centrifugal masses characterized by the fact that the spacer ring 29 is made of aluminum injection die-casting.

Another feature of the invention resides broadly in the flywheel with two centrifugal masses characterized by the fact that the spacer ring 29 is composed of individual sheet metal elements, whereby the carrier ring 30 is realized in one piece, and the spacer elements 22 are manufactured individually and installed on the carrier ring 30.

Some examples of transmissions in which the present invention may be incorporated may be disclosed by the following U.S. patents: U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies which could possibly be used in conjunction with the present invention may be disclosed in the following U.S. patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; and U.S. Pat. No. 4,651,857 to Schraut et al., entitled "Clutch Disc Unit for a Motor Vehicle Clutch".

Some examples of two-mass flywheels and the components thereof which may incorporate the present invention therein may be disclosed by the following U.S. patents: U.S. Pat. No. 5,103,688 to Kuhne, entitled "Two-Mass Flywheel"; U.S. Pat. No. 4,777,843 to Bopp, entitled "Two-Mass Flywheel Assembly With Viscous Damping Assembly".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 25 570.5, filed on Jul. 20, 1994, having inventors Bernhard Schierling, Rudolf Bauerlein, Cora Carlson, and Hilmar Göbel, and DE-OS P 44 25 570.5 and DE-PS P 44 25 570.5 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An internal combustion engine flywheel, said internal combustion engine flywheel comprising:
    a two-mass flywheel, said two-mass flywheel being rotatable about an axis of rotation and defining an axial direction parallel to the axis of rotation;
    said two-mass flywheel comprising:
        a first flywheel mass and a second flywheel mass disposed adjacent one another;
        said first flywheel mass comprising means for non-rotationally connecting said first flywheel mass to a crankshaft of an internal combustion engine;
        damping means for transmitting rotational torque from said first flywheel mass to said second flywheel mass, for rotating said second flywheel mass with said first flywheel mass;
        said second flywheel mass comprising a first part and a second part;
        said first part comprising a plurality of areas for being connected to said second part;
        said second part comprising a plurality of areas for being connected to said first part;
        said areas of said first part and said areas of said second part together forming a plurality of connection areas wherein said first part and said second part are connected to one another;
        a plurality of connecting elements for connecting said first part and said second part to one another, each of said connecting elements being disposed at a corresponding one of said plurality of connection areas;
        means for permitting air to flow between said first part and said second part for cooling at least said first part and said second part, said means for permitting being disposed adjacent said plurality of connection areas;
        said means for permitting comprising means for holding said first part and said second part in a spaced-apart relationship with respect to one another;
        said means for permitting further comprising a plurality of passage means, said plurality of passage means extending in a substantially radial direction with respect to the axis of rotation;
        each of said plurality of passage means being disposed circumferentially between two adjacent ones of said plurality of connection areas;
        said second flywheel mass comprising means for being connected to a friction clutch;
        said second part of said second flywheel mass comprising a friction surface for being disposed towards a friction clutch and for engaging with a friction clutch;
        said first part of said second flywheel mass comprising an inner circumference and an outer circumference, said inner circumference being disposed nearer to the axis of rotation than said outer circumference;
        a bearing disposed adjacent said inner circumference of said first part;
        said inner circumference of said first part of said second flywheel mass comprising a flange disposed substantially parallel with respect to the axis of rotation and disposed radially inside said connecting elements, said flange extending from said first part towards said second part;
        said flange comprising a shoulder being configured for fixing said bearing in the radial direction; and
        said flange comprising an edge portion extending from said flange towards the axis of rotation, said edge portion being configured for fixing said bearing in the axial direction.

2. The internal combustion engine flywheel according to claim 1 wherein:

said first part of said second flywheel mass further comprises a retaining element, said retaining element having a first side and a second side opposite one another, said first side facing away from said second part;

said first part of said second flywheel mass comprises a first side and a second side opposite one another, said first side facing said first flywheel mass;

said second side of said retaining element being disposed to contact a portion of said first side of said first part and to contact said bearing; and said retaining element being fixedly attached to said first side of said first part.

3. The internal combustion engine flywheel according to claim 2 wherein said areas of said first and second parts forming said connection areas are in contact with one another, said first and second parts contacting one another solely at said connection areas.

4. The internal combustion engine flywheel according to claim 3 wherein:

said holding means comprises a plurality of spacer elements; and said plurality of spacer elements being integral with one of: said first part of said second flywheel mass and said second part of said second flywheel mass.

5. The internal combustion engine flywheel according to claim 4 wherein:

said plurality of spacer elements are integral with said second part of said second flywheel mass;

said plurality of spacer elements each comprising one of said areas of said second part;

each of said areas of said first part and said second part comprising a flat portion to form a flat one of said connection areas being disposed substantially perpendicular to the axis of rotation, each of said connection areas being disposed at substantially the same radial distance from the axis of rotation;

said plurality of spacer elements comprising projecting portions extending from said second part towards said first part;

each of said connection areas comprising an opening extending through said first part and said second part, each of said connecting elements being disposed in a corresponding one of said openings and extending into said first part and said second part; and each of said projecting portions comprising one of the following shapes:
a circular shape; and
a circumferentially elongated, circular shape.

6. The internal combustion engine flywheel according to claim 4 wherein:

each of said plurality of spacer elements are integral with said second part of said second flywheel mass;

said plurality of spacer elements each comprising one of said areas of said second part;

each of said connection areas comprises an opening extending through said first part and said second part, each of said connecting elements being disposed in a corresponding one of said openings and extending into said first part and said second part;

each of said plurality of passage means comprises one of the following a), b) and c):

a) a plurality of individual passages disposed between two adjacent ones of said connecting areas, each of said individual passages extending axially into said second part and extending radially with respect to the axis of rotation;

each of said individual passages having a first passage part disposed at a substantial angle with respect to the axis of rotation, and a second passage part disposed radially with respect to the axis of rotation, said first passage part extending from said second passage part in a direction towards said first part of said second flywheel mass;

b) a plurality of individual passages disposed between two adjacent ones of said connecting areas, each of said individual passages extending axially into said second part and having a curved shape;

each of said individual passages having a first passage part disposed at a substantial angle with respect to the axis of rotation, and a second passage part disposed radially with respect to the axis of rotation, said first passage part extending from said second passage part in a direction towards said first part of said second flywheel mass; and c) a plurality of passages each having a generally triangular shape, each of said triangular passages being disposed between two adjacent ones of said connecting areas; and each of said triangular passages having a first passage part disposed at a substantial angle with respect to the axis of rotation, and a second passage part disposed radially with respect to the axis of rotation, said first passage part extending from said second passage part in a direction towards said first part of said second flywheel mass.

7. The internal combustion engine flywheel according to claim 4 wherein:

each of said plurality of spacer elements are integral with said second part of said second flywheel mass;

said plurality of spacer elements each comprising one of said areas of said second part; and each of said connection areas comprises an opening extending through said first part and said second part, each of said connecting elements being disposed in a corresponding one of said openings and extending into said first part and said second part.

8. The internal combustion engine flywheel according to claim 7 wherein:

each of said connection areas comprises a groove extending axially into said second part of said second flywheel mass in a direction away from said first part, each of said grooves having an outer radial dimension and an inner radial dimension disposed nearer to the axis of rotation than said outer radial dimension;

said first part of said second flywheel mass comprises a centering extension, said centering extension being annular and extending axially from said first part to said second part; and said centering extension having portions disposed within corresponding ones of said grooves, each of said portions of said centering extension comprising one of said areas of said first part.

9. The internal combustion engine flywheel according to claim 8 wherein:

each of said openings extend through said centering extension;

said centering extension having an outside diameter and an inside diameter, said openings of said centering extension being disposed between said outside diameter and said inside diameter of said centering extension; and said plurality of connecting elements comprises a plurality of rivets, each of said rivets extending through a corresponding one of said openings.

10. The internal combustion engine flywheel according to claim 9 wherein:

said plurality of passage means comprises a plurality of passages, each of said passages having a first passage part disposed at a substantial angle with respect to the axis of rotation, a second passage part disposed substantially perpendicular with respect to the axis of rotation, and a third passage part disposed substantially parallel to the axis of rotation;

said second passage part having a first end and a second end and being disposed between said first passage part and said third passage part;

said first passage part extending from said first end of said second passage part in a direction towards said first part of said second flywheel mass;

said third passage part extending from said second end of said second passage part axially away from said first flywheel mass;

said first part comprising a sheet metal part; and said first part comprising a plurality of rivet extensions extending from said first side of said first part, said rivet extensions being disposed to fix said retaining element against said first side of said first part.

11. The internal combustion engine flywheel according to claim 4 wherein:

said plurality of spacer elements are integral with said first part of said second flywheel mass, said plurality of spacer elements being disposed circumferentially about said inner circumference of said first part;

said plurality of spacer elements each comprising one of said areas of said first part;

each of said areas of said first part and said second part comprising a flat portion to form a flat one of said connection areas disposed substantially perpendicular with respect to the axis of rotation, each of said plurality of connection areas being disposed at substantially the same radial distance from the axis of rotation; and said first part of said second flywheel mass comprises a sheet metal part.

12. The internal combustion engine flywheel according to claim 11 wherein:

said sheet metal part is corrugated to form said plurality of spacer elements, said plurality of spacer elements each projecting from said first part towards said second part; and each of said plurality of connection areas comprising an opening extending through said first part and said second part, each of said connecting elements being disposed in a corresponding one of said openings.

13. The internal combustion engine flywheel according to claim 11 wherein:

said plurality of spacer elements comprises a plurality of extruded portions of said first part, said extruded portions extending from said first part to said second part;

each of said plurality of connection areas comprising an opening extending through said first part and said second part, each of said connecting elements being disposed in a corresponding one of said openings;

said first part comprises a first side and a second side opposite one another, said first side facing away from said second part; and said extruded portions having been formed by pressing portions of said first side of said first part towards said second part.

14. The internal combustion engine flywheel according to claim 2 wherein:

said holding means comprises said plurality of connecting elements and is integral with said plurality of connecting elements;

said plurality of connecting elements comprising a plurality of rivets, each of said rivets having a first terminal end portion disposed adjacent said first part, a second terminal end portion disposed adjacent said second part, and an intermediate portion disposed between said first terminal end portion and said second terminal end portion;

each of said rivets having a shank diameter defined perpendicular with respect to the axis of rotation;

said intermediate portion of said rivets comprising:

a diameter defined perpendicular to the axis of rotation, said diameter being substantially greater than said shank diameter;

a first stop edge and a second stop edge disposed a substantial axial distance from one another;

a length dimension defined parallel to the axis of rotation and extending between said first stop edge and said second stop edge;

said first stop edge contacting a corresponding one of said areas of said first part of said second flywheel mass;

said second stop edge contacting a corresponding one of said areas of said second part of said second flywheel mass; and said length dimension being sufficiently long to permit formation of an additional passage extending between said first part and said second part of said second flywheel mass, each of said plurality of passage means comprising a portion of said additional passage and extending into said second part;

said first part comprises an annular recess for receiving said first stop edge;

said second part comprises an annular recess for receiving said second stop edge; and said first stop edge being disposed in said annular recess of said first part and said second stop edge being disposed in said annular recess of said second part.

15. The internal combustion engine flywheel according to claim 2 wherein:

said holding means comprises a spacer ring disposed substantially concentrically with respect to the axis of rotation;

said spacer ring comprises a plurality of spacer elements disposed circumferentially about said spacer ring, said spacer elements extending in an axial direction from said spacer ring; and each of said spacer elements comprises an opening extending through said spacer element and through said spacer ring, said plurality of connecting elements extending through a corresponding one of said openings.

16. The internal combustion engine flywheel according to claim 15 wherein:

said spacer ring comprises an outside circumference and an inside circumference disposed nearer to the axis of rotation than said outside circumference of said spacer ring;

said inside circumference of said spacer ring engaging a portion of said shoulder;

said second part comprises a recess extending axially into said second part in a direction away from said first part, a portion of said outside circumference of said spacer ring engaging said recess;

said spacer ring comprises one of the following a), b), and c):

a) said spacer ring comprises non-ferrous material able to withstand high temperatures;

b) said spacer ring comprises aluminum, said aluminum having been injected molded to form said spacer ring; and c) said spacer ring and said spacer elements being separate parts, said spacer elements being fixedly attached to said spacer ring and said spacer ring and said spacer elements comprising sheet metal.

17. The internal combustion engine flywheel according to claim 16 wherein:

said spacer elements each have an inside and an outside diameter;

said spacer ring has an inside and an outside diameter;

said inside diameter of said spacer elements being smaller than said inside diameter of said spacer ring;

said spacer ring further comprises a beveled portion disposed at said inside diameter of said spacer ring; and said inside diameter of said spacer elements contacting said shoulder of said first part and said outside diameter of said spacer elements contacting said recess of said second part.

* * * * *